United States Patent [19]

Self et al.

[11] 3,844,854

[45] Oct. 29, 1974

[54] STABILIZATION OF LIGHT METAL HYDRIDE

[75] Inventors: James M. Self, Wilmington, Del.; Norman E. Matzek, Midland, Mich.

[73] Assignee: The Dow Chemical Company, Midland, Mich.

[22] Filed: Sept. 20, 1967

[21] Appl. No.: 670,022

[52] U.S. Cl.................... 149/6, 149/87, 149/109, 117/127
[51] Int. Cl............................................. C06b 15/00
[58] Field of Search............. 23/204; 149/6, 7, 109, 149/87; 117/127

[56] References Cited
UNITED STATES PATENTS

| | | | |
|---|---|---|---|
| 3,373,062 | 3/1968 | Morris | 149/6 |
| 3,377,955 | 4/1968 | Hodgson | 149/6 X |
| 3,395,055 | 7/1968 | Sparks et al. | 149/6 X |

*Primary Examiner*—Stephen J. Lechert, Jr.
*Attorney, Agent, or Firm*—C. Kenneth Bjork

[57] ABSTRACT

A crystalline, substantially non-solvated aluminum hydride having a surface coating of an organic compound containing at least one phenyl group or a condensed ring structure and ordinarily containing an unsaturated linkage. This composition exhibits an increased thermal stability over that shown by the uncoated aluminum hydride.

4 Claims, No Drawings

STABILIZATION OF LIGHT METAL HYDRIDE

BACKGROUND OF THE INVENTION

This invention relates to the thermal stabilization of aluminum hydride and more particularly is concerned with a surface treatment for substantially non-solvated particulate aluminum hydride which provides for improved storageability and thermal stability of the hydride at elevated temperatures.

Novel crystal forms of non-solvated aluminum hydride as disclosed in copending applications Ser. No. 179,509, filed Mar. 8, 1962, and Ser. No. 234,277, filed Oct. 23, 1962, have been found to be particularly suitable for use as fuels in rocket propellant formulations.

However, these and other forms of aluminum hydride by nature are thermodynamically unstable at moderately elevated temperatures e.g. 50-120° C. and higher, and undergo spontaneous detrimental decomposition when subjected to such elevated temperatures.

Since rockets and missiles many times must be stored for extended periods of time under a variety of climatic conditions, it is very desirable that the autodecomposition of aluminum hydride be reduced to a minimum and its stable life at both high and low atmospheric temperatures be prolonged to assure functioning of a propellant grain containing this fuel or sensitizer component at the required time.

It is a principal object of the present invention to provide a treatment for substantially non-solvated forms of aluminum hydride whereby the resistance of the material to degradation at elevated temperatures is markedly increased.

It is another object of the present invention to provide a surface coating treatment for aluminum hydride which increases the resistance of the aluminum hydride to thermal degradation and also aids in promoting the compatibility of the material with other components of propellant formulations.

It is a further object of the present invention to provide a surface treatment for aluminum hydride which does not detrimentally degrade the material with respect to its chemical reactivity.

It is also an object of the present invention to provide a surface treatment for aluminum hydride which imparts thermal stability to the aluminum hydride at elevated temperature even after prolonged storage.

These and other objects and advantages readily will become apparent from the detailed description presented hereinafter.

SUMMARY

In accordance with the present invention, the thermal stability of aluminum hydride is markedly increased by providing a surface treatment for the particulate aluminum hydride material. More particularly the aluminum hydride is stabilized by sorbing a small amount of a stabilizing agent thereon, said stabilizing agent being an organic compound having at least one phenyl group or a condensed ring structure and ordinarily containing an unsaturated linkage, e.g., ethylenic or acetylenic bond, in the molecule.

Ordinarily a small amount, from as little as about 0.25 per cent to about 5 per cent or more, based on the weight of the aluminum hydride, of the stabilizing agent, expressed as per cent carbon, is chemabsorbed or otherwise absorbed, adsorbed or introduced onto the surface of the aluminum hydride. The actual amount to be employed with a particular aluminum hydride product is determined by the surface area of the particulate hydride and the size of the molecule of the stabilizing agent.

The stabilizing agent to be employed can be any of a variety of phenyl group containing materials which do not detrimentally attack the aluminum hydride but do impart thermal degradation resistance to the hydride and which are readily sorbed onto the hydride surface. If the so-stabilized aluminum hydride is to be employed in a propellant formulation the surface stabilizer is further characterized in that it does not react detrimentally with the formulation components of the propellant.

Illustrative stabilizers which have been shown to impart marked resistance to thermal degradation of aluminum hydride include, for example, diphenyl acetylene ($\phi$—C≡C—$\phi$), cis- and trans-stilbene

symmetrical diethyldiphenylurea

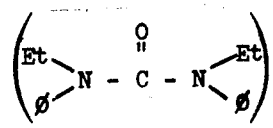

dinitrostilbene

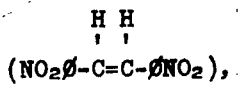

diaminostilbene

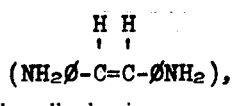

(anilinophenyl)phenylhydrazine

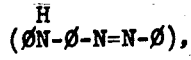

nitrophenylaniline

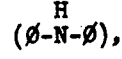

azobenzene ($\phi$N=N$\phi$), tetraphenyl hydrazine ($\phi_2$N—N$\phi_2$), α-anilino, β-phenylbenzamide stilbene

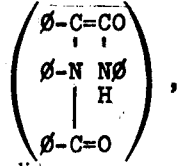

N,N'-carbonyl diquinoline

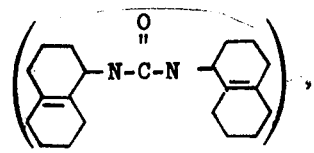

and benzene dicarbonitrile (N C—$\phi$—C N). In the depicted formulas the symbol $\phi$ is used to represent the phenyl group.

Liquid stabilizing agents which are not readily volatilizable or solid stabilizing agents advantageously can be dissolved in an inert solvent and the aluminum hydride be treated with the solution as by immersion or washing to provide the surface treatment.

In certain instances, the aluminum hydride can be treated directly with a liquid stabilizing agent or a solution of the stabilizing agent in an inert solvent. For example, aluminum hydride which has been stored under a benzene or diethyl ether solution of diphenylacetylene exhibits good stabilization.

An advantage of the present invention is that the small amount of stabilizing agent sorbed to the aluminum hydride provides no detrimental degradation or dilution of the hydride product while markedly improving its storage characteristics.

DESCRIPTION OF PREFERRED EMBODIMENTS

In a preferred embodiment of the present invention, diphenylacetylene in an amount, expressed as per cent carbon, of from about 1 to about 2.5 weight per cent of the aluminum hydride is sorbed onto the particulate aluminum hydride.

Conveniently, the particulate aluminum hydride is contacted, as by washing, with a dilute solution of diphenyl acetylene, the so-treated material separated from residual liquids and dried. For optimum in stabilization, the aluminum hydride is treated upon initial recovery from a preparative reaction mass and prior to drying.

The solvent for carrying the diphenylacetylene can be any of a variety of organic liquids which is inert, i.e., does not degrade or react with the aluminum hydride and which preferably has a relatively high vapor pressure to facilitate solvent removal and drying of the diphenylacetylene coated aluminum hydride. Representative solvents include aliphatic and aromatic hydrocarbons and alkyl ethers such as, for example, benzene, diethyl ether, n-propyl ether, isopropyl ether, toluene, xylene, hexane, and the like.

As indicated hereinbefore, diphenylacetylene has been found to markedly increase the thermal stabilization of crystalline, non-solvated aluminum hydride. This stabilization by diphenylacetylene is even more pronounced with aluminum hydrides of this type which have been "doped" with or have incorporated into their crystal lattice small amounts of magnesium, i.e., at least about 0.01 weight per cent, as disclosed in application Ser. No. 472,403.

The following Examples will serve to further illustrate the invention but are not meant to limit it thereto.

EXAMPLE 1

A hexagonal, substantially nonsolvated, particulate aluminum hydride having about 1.7 weight per cent magnesium incorporated into the crystal lattice structure was prepared by the following procedure.

Dilute diethyl ether solutions (~ 0.01 molar) of aluminum chloride and lithium aluminum hydride (LiAlH$_4$/AlCl$_3$ molar ratio of about 3.8) were mixed at room temperature. The resulting mixture was filtered through a medium glass frit to remove precipitated lithium chloride therefrom into a dilute diethyl ether solution containing lithium borohydride in a molar quantity about equal to that of the initial aluminum chloride reactant. Ground magnesium chloride in an amount calculated to give a predetermined magnesium concentration in the final aluminum hydride product along with a large excess of benzene were added to the reaction mixture to provide a solution containing about 30 volume per cent with repsect to the ether.

The resulting mixture was stirred for about 20 minutes, filtered into a reaction flask and the reaction flask connected to a distillation column. The reaction flask with the product solution was immersed in an oil bath maintained at approximately 105° C. and the ether removed by distillation over about a 2.5 hour period. The reaction vessel containing a white crystalline product was removed from the distillation column and the product washed with diethyl ether. The solid product was then dried at ambient temperature, i.e., ~18°-20° C., under a reduced pressure of about $1 \times 10^{-3}$ millimeter mercury absolute.

All manipulative and operating procedures were carried out in the presence of a substantially anhydrous nitrogen atmosphere and all reactants, solvents and liquid carriers were substantially moisture free.

Elemental analysis of the resulting white crystalline product showed carbon less than 0.1 percent and magnesium about 1.7 percent.

The unit cell dimensions for the aluminum hydride product as calculated from an X-ray powder diffraction pattern of the hexagonal crystal structure were increased slightly over that obtained from a non-magnesium treated hexagonal crystalline aluminum hydride prepared using the same technique. The increase in lattice constants for the magnesium containing product indicated the magnesium values were incorporated into the crystal lattice structure of the aluminum hydride giving an expanded unit cell.

A sample of this aluminum hydride product was washed with a solution containing the equivalent of 50 milligrams of diphenylacetylene per 250 milliliters of benzene and the so-treated solid product dried by passing dry nitrogen over the product.

An untreated sample of the magnesium containing aluminum hydride as control and a sample of the diphenylacetylene treated product were stored at a temperature of 60° C. and the per cent autodecomposition, as determined by gas pressure measurements using a pressure transducer, was measured. The results of this study are summarized in Table I.

Table I

| No. | Days on Test | Decomposition % | |
| | | Control | Diphenylacetylene Treated Product |
| --- | --- | --- | --- |
| 1 | 2 | 0.05 | 0.04 |
| 2 | 4 | 0.08 | 0.07 |
| 3 | 6 | 0.18 | 0.12 |
| 4 | 8 | 0.35 | 0.25 |
| 5 | 10 | 0.59 | 0.40 |
| 6 | 12 | 0.85 | 0.56 |
| 7 | 14 | 1.15 | 0.73 |

EXAMPLE 2

A hexagonal, substantially nonsolvated aluminum hydride was prepared following the same general procedure described in Example 1 except that no magnesium was incorporated into the crystal lattice. A portion of this product, referred to as normal aluminum hydride for purposes of identification, was washed with a solution containing 2 grams of diphenylacetylene per 250 milliliters of benzene and the so-treated product dried with nitrogen. Analysis of this product gave C-2.9 percent; H-10.0 percent; Al-86.2 percent; Cl-0.3 percent; Li-0.2 percent.

A batch of the magnesium doped aluminum hydride crystals prepared by the process described in Example 1 were similarly treated with a diphenylacetylene-benzene solution of this same concentration. This product analyzed C-1.3 percent; H-9.9 percent; Al-85.8 percent; Mg-1.7 percent; Cl-0.5 percent; Li-0.5 percent.

Each of the diphenylacetylene treated samples and the corresponding untreated aluminum hydride product, as controls, were stored at 60° C. and gas pressure measurements made to determine the amount of decomposition with time. The results of this study are summarized in Table II.

Table II

| No. | Days on Test | Normal AlH$_3$ (control) | Decomposition - Per Cent | | |
|---|---|---|---|---|---|
| | | | Diphenylacetylene Coated Normal AlH$_3$ | Mg Doped AlH$_3$ (control) | Diphenylacetylene Coated Mg Doped AlH$_3$ |
| 1 | 6 | >1.5 | 0.3 | 0.09 | 0.06 |
| 2 | 12 | — | >1.5 | 0.8 | 0.17 |
| 3 | 18 | — | — | >1.5 | 0.20 |
| 4 | 24 | — | — | — | 0.28 |
| 5 | 30 | — | — | — | 0.37 |
| 6 | 36 | — | — | — | 0.49 |
| 7 | 42 | — | — | — | 0.62 |
| 8 | 48 | — | — | — | 0.84 |
| 9 | 54 | — | — | — | 1.10 |

EXAMPLE 3

Separate samples of the magnesium doped aluminum hydride (~1.7 percent Mg content) were washed with a solution containing either 4.47, 3.12, 1.78 or 0.445 grams of diphenylacetylene per 250 milliliters of benzene. The so-treated samples were dried and analyzed for residual carbon content to determine the effect of solution concentration on diphenylacetylene coating on the aluminum hydride product.

The treating solutions were reused to treat fresh samples of aluminum hydride to determine if satisfactory coatings could result from "used" treating solutions. The results of this study are summarized in Table III.

Table III

| Test No. | Treating Solution (g. diphenylacetylene/ 210 ml. benzene) | Aluminum Hydride Coating (expressed as wt.% carbon) | |
|---|---|---|---|
| | | First Wash | Second Wash |
| 1a | 0.445 | 0.25 | — |
| 1b | do. | — | 0.25 |
| 2a | 1.78 | 0.70 | — |
| 2b | do. | — | 0.50 |
| 3a | 3.12 | 1.50 | — |
| 3b | do. | — | 1.20 |
| 4a | 4.47 | 2.45 | — |
| 4b | do. | — | 2.0 |

These studies show that the treating solutions could be re-used or used to treat larger quantities of aluminum hydride. As might be expected, the coating content was somewhat reduced for the second wash because of diphenylacetylene depletion. However, this loss readily can be compensated by adding incremental amounts of make-up diphenylacetylene to the treating solution prior to use on a fresh batch of aluminum hydride.

EXAMPLE 4

A number of samples of the hexagonal crystalline aluminum hydride containing about 1.7 per cent magnesium were coated with predetermined quantities of diphenylacetylene using the technique set forth hereinbefore. These were then stored at 60° C. and the days required to reach one per cent decomposition noted. The results of this study are presented in Table IV.

Table IV

| Test No. | Diphenylacetylene Coating (wt. percent) | Time For 1% Decomposition (days) |
|---|---|---|
| 1 | 0.5 | 14 |
| 2 | 1.0 | 25–26 |
| 3 | 1.5 | 27 |
| 4 | 2.0 | 28 |
| 5 | 2.5 | 29 |
| Control (no coating) | — | 13 |

EXAMPLE 5

An accelerated decomposition study was made evaluating a number of stabilizers for crystalline, non-solvated aluminum hydride.

For these studies, about 0.25 gram of a nonsolvated hexagonal crystalline aluminum hydride (no magnesium doping) prepared by following the procedure described in Example 1 was physically mixed by stirring with 0.25 gram of stabilizing agent and the resulting mixture heated at a temperature of about 100° C.

The effectiveness of the various stabilizers was noted and these ranked using diphenylacetylene as a base.

From the study diphenylacetylene and cis- and trans-stilbene were shown to be good.

Symmetrical diethyldiphenylurea, dinitrostilbene, diaminostilbene, tetraphenylhydrazine, nitrophenylaniline, (anilinophenyl)phenylhydrazine, azobenzene, N,N'-carbonyl diquinoline, benzene dicarbonitrile and α-anilino, β-phenylbenzamidostilbene gave somewhat reduced stabilization and were rated as fair by comparison.

Various modifications can be made in the present invention without departing from the spirit or scope thereof for it is understood that we limit ourselves only as defined in the appended claims.

We claim:

1. A substantially non-solvated, crystalline, aluminum hydride having an enhanced thermal stability which comprises;
   a substantially non-solvated aluminum hydride having a surface coating of a member selected from the group consisting of diphenyl acetylene, cis- and trans-stilbene, symmetrical diethyldiphenylurea, dinitro-stilbene, diaminostilbene, (anilinophenyl)-phenylhydrazine, nitrophenylaniline, azobenzene, tetraphenyl hydrazine, α-anilino, β-phenylbenzamide stilbene, N,N'-carbonyl diquinoline, and benzene dicarbonitrile.

2. The aluminum hydride composition as defined in claim 1 wherein the surface coating expressed as weight per cent carbon ranges from about 0.25 to about 5 per cent of the weight of said aluminum hydride.

3. The aluminum hydride composition as defined in claim 1 wherein the surface coating member is diphenylacetylene.

4. The aluminum hydride composition as defined in claim 3 wherein the diphenylacetylene surface coating, expressed as weight per cent carbon, ranges from about 1 to about 2.5 per cent of the weight of said aluminum hydride.

* * * * *